United States Patent [19]
Bailey

[11] 3,978,737
[45] Sept. 7, 1976

[54] CHAIN TENSIONING DEVICE

[75] Inventor: Ward E. Bailey, Plano, Tex.

[73] Assignee: Xerox Corporation, Stamford, Conn.

[22] Filed: Aug. 27, 1975

[21] Appl. No.: 608,118

[52] U.S. Cl. ................... 74/242.11 C; 74/242.14 R
[51] Int. Cl.² ........................ F16H 7/12; F16H 7/10
[58] Field of Search ............ 74/242.11 C, 242.11 A, 74/242.14 R, 242.1 A

[56] References Cited
UNITED STATES PATENTS

| | | | |
|---|---|---|---|
| 510,694 | 12/1893 | Marsh | 74/242.1 A |
| 574,646 | 1/1897 | Walkins | 74/242.1 A X |
| 668,378 | 2/1901 | Korth et al. | 74/242.14 R |
| 716,520 | 12/1902 | Cole | 74/242.11 A |
| 1,297,108 | 3/1919 | Cunningham | 74/242.11 A X |

*Primary Examiner*—Leonard H. Gerin
*Attorney, Agent, or Firm*—Sheldon F. Raizes

[57] ABSTRACT

A chain tensioning device is provided wherein a spring biased sprocket engages a chain to exert tension thereon. The device includes a mechanism to allow a service person to relieve the tension exerted on the chain by the tensioning device and to inactivate the spring biasing force while leaving both hands free to repair or replace the chain. The construction of the mechanism allows a simple manipulation to activate the spring biasing force to exert tension on the chain after the chain has been repaired or replaced.

10 Claims, 4 Drawing Figures

CHAIN TENSIONING DEVICE

DESCRIPTION OF THE INVENTION

It is an object of this invention to provide a chain tension device for a chain drive.

It is a further object of this invention to construct the chain tension device in such a manner that a service person will be able to relieve tension on the chain, thereafter have his hands free to either replace the chain or fix the same and then be able to automatically effect proper tension on the chain by a very simple manipulation of the device.

It is an overall object of the invention to accomplish the above objects with a simple and economical device.

Other objects of the invention will become apparent from the following description with reference to the drawing wherein.

Figure 1:
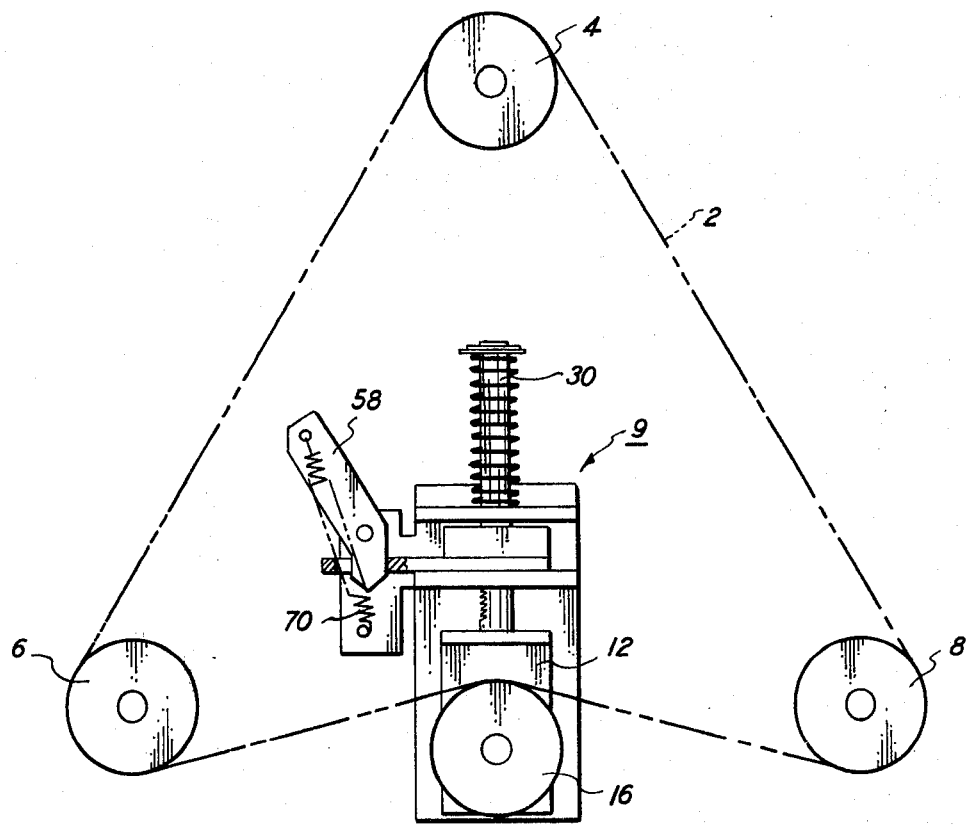
FIG. 1 is a side view of a chain drive system utilizing a chain tensioning device.

Referring to FIG. 1, a typical chain drive system is illustrated wherein a chain 2 is wrapped around a drive gear 4 and a pair of idling gears 6 and 8. A tensioning device 9 is located between the idling gears 6 and 8 to effect and maintain tension on the chain 2.

Figure 4:
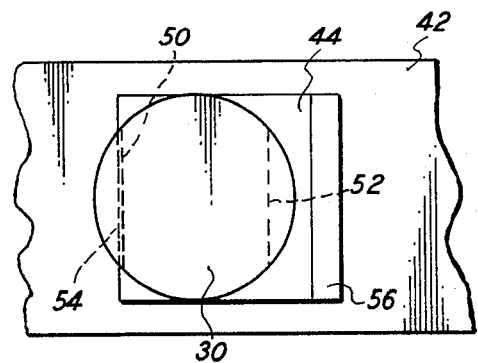
FIG. 4 is a simplified top view illustrating the relationship between the serrated and notched portions of a shaft and retainer bar of the tensioning device.
Figure 2:
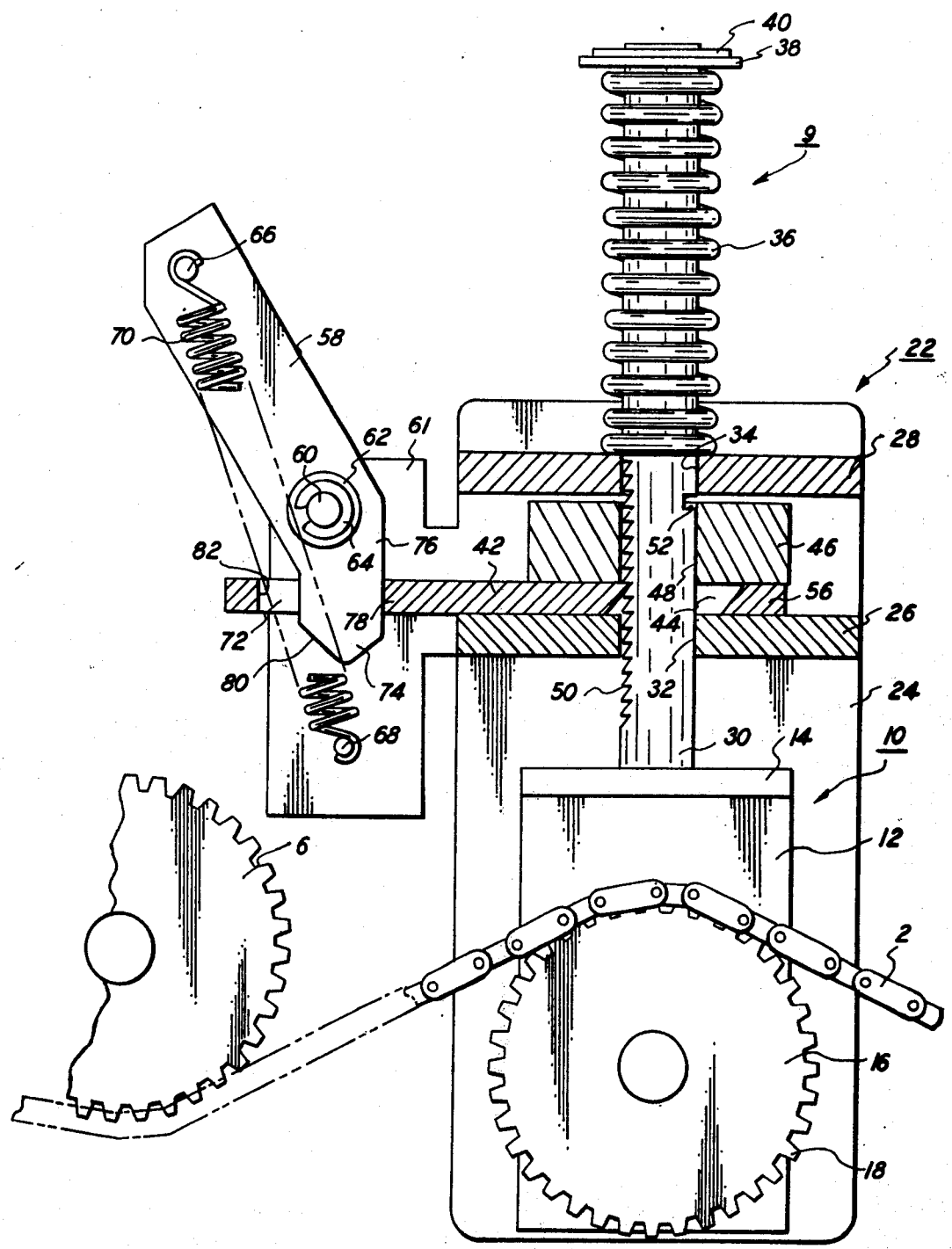
FIG. 2 is a sectional view of a chain tensioning device in a tension effecting mode.
Figure 3:
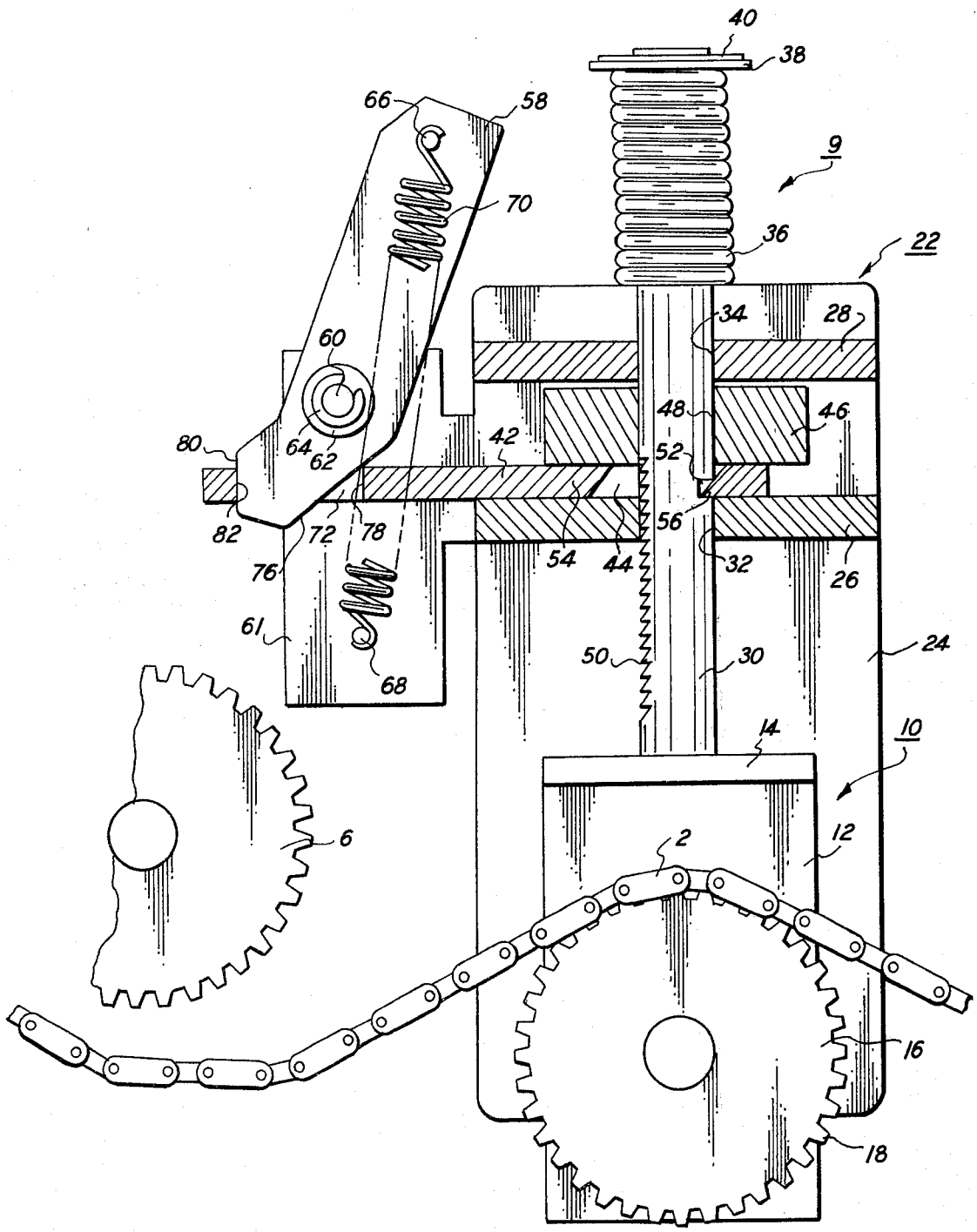
FIG. 3 is a view similar to FIG. 2 only illustrating the chain tensioning device in a relaxed mode.

Referring to FIGS. 2–4, the tensioning device 9 includes an L-shaped bracket 10 which comprises a pair of legs 12 and 14. A sprocket wheel 16 is rotatably mounted on the leg 12 and has a plurality of teeth 18 on its outer periphery for meshing with the chain 2 which travels through the space between the sprocket 16 and the leg 14. A stationary support bracket 22 is provided which comprises a plate 24 and a pair of crossplates 26 and 28 joined to the plate 24. A round shaft 30 is secured to the leg 14 of the bracket 10 and extends through openings 32 and 34 of the crossplates 26 and 28, respectively. A coil spring 36 surrounds the upper portion of the shaft 30 and is compressed between the plate 28 and a washer 38. The washer is retained on the shaft 30 by a clip 40 which snaps into a groove (not shown) at the upper end of the shaft 30. Thus, the compression force of the spring 36 is transferred to the washer 38 to urge the shaft upwards or in a tensioning direction.

A retainer bar 42 has an opening 44 slidably receiving shaft 30 therethrough and is carried on crossplate 26 for reciprocal slidable movement. A spacer member 46 is located between the retainer bar 42 and crossplate 28 and has an opening 48 slidably receiving the shaft 30 therethrough.

A length of the shaft has chordal serrations to provide a plurality of teeth 50. A chordal notch 52 is provided diametrically opposite the serrated portion. The wall of opening 44 opposite the serrated face of shaft 30 is slanted inwards and upwards to provide a detent tooth section 54 complementary to the serrations 50. The serrations 50 and the tooth section 54 are so constructed that when engaged with each other, the tooth 54 will allow movement of the shaft upwards in the tensioning direction but prevent movement thereof downwards in the opposite direction beyond the pitch of the serrations. The wall of opening 44 opposite the notched face is slanted inwards and downwards to provide a detent tooth 56 to engage notch 52. The detent tooth 56 and the notch 52 are so constructed that when engaged with each other, the tooth 56 will prevent movement of the shaft 30 upwards in the tensioning direction but permit movement of the shaft downwards in the opposite direction.

A lever 58 is pivotally mounted on a shaft 60 extending from an extension 61 of one wall 24 of support member 22. A washer 62 and retainer clip 64 secure the lever 58 to the shaft 60. Pins 66 and 68 extend from one end of the lever 58 and extension 61 of the wall 24, respectively, and a spring 70 is stretched between the pins 66, 68 to provide an overcenter spring force acting on the lever 58. The retainer bar 42 has an opening 72 receiving an end 74 of lever 58 therethrough. The lever end 74 has an edge 76 which is arranged to engage edge 78 of opening 72 and has an edge 80 which is arranged to engage edge 82 of opening 72. In FIG. 1, the lever edge 76 is shown engaging the edge 78 of retainer bar 42 to urge the bar, due to the counterclockwise rotational force of spring 70 acting on the lever 58, to the right to bring tooth 54 into engagement with serrations 50. In FIG. 2, the lever edge 78 is shown engaging the edge 82 of retainer bar 42 to urge the bar, due to the clockwise rotational force of spring 70 acting on the lever 58, to the left to bring tooth 56 into engagement with notch 52.

The operation of the tensioning device is as follows: During the normal tensioning mode of operation, the lever 58 is in the position as shown in FIG. 2 whereby the spring 70 urges the edge 76 of the lever 58 into engagement with the edge 78 of the retainer bar 42 thereby urging the detent tooth 54 into engagement with the serrated teeth 50. The spring 36 urges the shaft and thereby the sprocket wheel 16 upwards exerting tension on the chain 2. As the chain stretches, the spring urges the shaft upwards to maintain constant tension thereon whereby a serrated tooth 50 will slide up detent tooth 54 and the detent tooth 54 will engage a new tooth 50 and prevent the shaft from moving downwards and allow the chain to slacken. When it is desired to service the chain to either repair or replace the same, a service person flips the lever 58 to the right to the position shown in FIG. 3. The spring 70 urges the edge 80 of lever into engagement with edge 82 of the retainer bar 42 thereby moving the retainer bar 42 to the left to bring the retainer tooth 56 into engagement with the shaft 30. The service person then depresses the shaft 30 against the force of spring 36 until the detent tooth 56 slips into the notch 52. The detent 56 prevents spring 36 from moving the shaft upwards. The tension on chain 2 is relieved and the same may be removed and either repaired or replaced. When the chain is back in position and it is desired to have tension exerted thereon by sprocket wheel 16, the service person moves the lever back to the position shown in FIG. 1 whereby the detent 56 is removed from the notch 52 and the spring moves the shaft 30 upwards effecting tension on the chain 2, and detent 54 engages the serrated teeth 50 to maintain such tension.

It should be realized that the above described tensioning device may be utilized with an endless belt or web rather than a chain. Obviously, a pulley would have to be substituted for the sprocket wheel 16.

What is claimed is:

1. A tensioner for an endless member comprising: a support, a shaft mounted for slidable movement in an axial direction on said support, a tension wheel carried by said shaft for rotation about an axis transverse to the shaft axis, means for urging said shaft in an endless member tensioning direction, a detent member slidably mounted on said support for reciprocal movement in a direction transverse to the axis of said shaft, an opening in said detent member through which said shaft extends, first detent means on an axially extending portion of said shaft, second detent means on the opposite side of said shaft, third and fourth detent means on said detent member, said first and third detent means being so constructed and arranged to engage each other and allow movement of said shaft in said tensioning direction and prevent movement thereof in the opposite direction when said detent member is in an endless member tensioning position, said second detent means being axially spaced from said fourth detent means when said detent member is in said endless member tensioning position, said second and fourth detent means being so constructed and arranged to engage each other to prevent movement of said shaft in said endless member tensioning direction when said detent member is out of said endless member tensioning position and in an endless member loosening position, and means for moving said detent member into either said endless member tensioning position or said endless member loosening position.

2. The structure as recited in claim 1 wherein said first detent means is serrated teeth, said second detent means is a notch and each of said third and fourth detent means is a tooth which is complementary to said serrated teeth and said notch.

3. The structure as recited in claim 1 wherein said endless member is a chain.

4. The structure as recited in claim 3 wherein said third and fourth detent means are opposite edges of said detent member opening.

5. A tensioner for an endless member comprising: a support, a shaft mounted for slidable movement in an axial direction on said support, a tension wheel carried by said shaft for rotation about an axis transverse to the shaft axis, means for urging said shaft in an endless member tensioning direction, a detent member slidably mounted on said support for reciprocal movement in a direction transverse to the axis of said shaft, an opening in said detent member through which said shaft extends, first detent means on an axially extending portion of said shaft, second detent means on the opposite side of said shaft, third and fourth detent means on said detent member, said first and third detent means being so constructed and arranged to engage each other and allow movement of said shaft in said tensioning direction and prevent movement thereof in the opposite direction when said detent member is in an endless member tensioning position, said second detent means being axially spaced from said fourth detent means when said detent member is in said endless member tensioning position and being so constructed and arranged to engage said shaft to allow movement thereof in opposite axial directions when said detent member is out of said endless member tensioning position and in an intermediate endless member loosening position, said second and fourth detent means being constructed and arranged to engage each other to prevent movement of said shaft in said endless member tensioning direction when said detent member is out of said endless member tensioning position and in a final endless member loosening position, means for moving said detent member into either said endless member tensioning position or endless member intermediate loosening position, and means for urging said detent member into said final endless member loosening position when said detent member is in said intermediate endless member tensioning position whereby said second detent means engages said fourth detent means when said fourth detent means becomes aligned therewith.

6. The structure as recited in claim 5 wherein said first detent means is serrated teeth, said second detent means is a notch and each of said third and fourth detent means is a tooth which is complementary to said serrated teeth and said notch.

7. The structure as recited in claim 6 wherein said endless member is a chain.

8. The structure as recited in claim 7 wherein said third and fourth detent means are opposite edges of said detent member opening.

9. the structure as recited in claim 5 wherein said means for moving said detent member into said endless member tensioning position and said endless member intermediate loosening position is a lever operatively connected to said detent member, and said means urging said detent member into said final endless member loosening position from said endless member intermediate loosening position being a resilient member operatively connected to said detent member.

10. the structure as recited in claim 7 wherein said means for moving said detent member into said endless member tensioning position and said endless member intermediate loosening position is a lever operatively connected to said detent member, and said means urging said detent member into said final endless member loosening position from said endless member intermediate loosening position being a resilient member operatively connected to said detent member.

* * * * *